(12) United States Patent
Kang et al.

(10) Patent No.: US 12,498,744 B2
(45) Date of Patent: Dec. 16, 2025

(54) VOLTAGE GENERATION CIRCUIT AND SEMICONDUCTOR DEVICE USING THE SAME

(71) Applicant: SK hynix Inc., Icheon-si (KR)

(72) Inventors: Ji Hyo Kang, Icheon-si (KR); Sung Kwon Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 218 days.

(21) Appl. No.: 18/505,879

(22) Filed: Nov. 9, 2023

(65) Prior Publication Data
US 2024/0385635 A1    Nov. 21, 2024

(30) Foreign Application Priority Data

May 19, 2023    (KR) .................. 10-2023-0065023

(51) Int. Cl.
  *G05F 1/46* (2006.01)
  *G05F 3/16* (2006.01)
  *H03F 3/45* (2006.01)
(52) U.S. Cl.
  CPC ............. *G05F 1/465* (2013.01); *G05F 3/16* (2013.01); *H03F 3/45179* (2013.01)
(58) Field of Classification Search
  CPC ......... G11C 5/147; G11C 5/143; G11C 5/145; G11C 5/025; G11C 7/12; G11C 8/08; G11C 29/12005; G11C 16/0425; G11C 16/06; G05F 1/465; G05F 1/468; G05F 3/16; G05F 1/625
  See application file for complete search history.

(56) References Cited

U.S. PATENT DOCUMENTS

| | | | | |
|---|---|---|---|---|
| 7,737,771 B2 * | 6/2010 | Kawano | ............. | H01L 23/5286 327/544 |
| 2007/0263474 A1 * | 11/2007 | Liston | .................... | G11C 5/144 365/230.06 |
| 2011/0227412 A1 | 9/2011 | Xu et al. | | |
| 2015/0228311 A1 * | 8/2015 | Kim | ................. | G11C 29/12005 327/540 |

* cited by examiner

*Primary Examiner* — Lincoln D Donovan
*Assistant Examiner* — Tyler J Pereny
(74) *Attorney, Agent, or Firm* — WILLIAM PARK AND ASSOCIATES LTD.

(57) ABSTRACT

A voltage generation circuit includes a global driver, a local driver, and a local voltage converter. The global driver changes the voltage level of a second voltage line based on the voltage levels of a first boundary voltage and a first voltage line and changes the voltage level of a fourth voltage line based on the voltage levels of a second boundary voltage and a third voltage line. The local driver adjusts the voltage levels of the first and third voltage lines based on the voltage levels of the second and fourth voltage lines. The local voltage converter generates an internal voltage having a voltage level between the voltage levels of the first and third voltage lines.

21 Claims, 11 Drawing Sheets

FIG. 3

| SIZE OF LOCAL RESISTOR | DIFFERENCE BETWEEN VIN1 AND VIN4 | AREA OF LOCAL VOLTAGE CONVERTER | SETTLEMENT TIME |
|---|---|---|---|
| REDUCE ↕ INCREASE | INCREASE ↕ REDUCE | REDUCE ↕ INCREASE | REDUCE ↕ INCREASE |

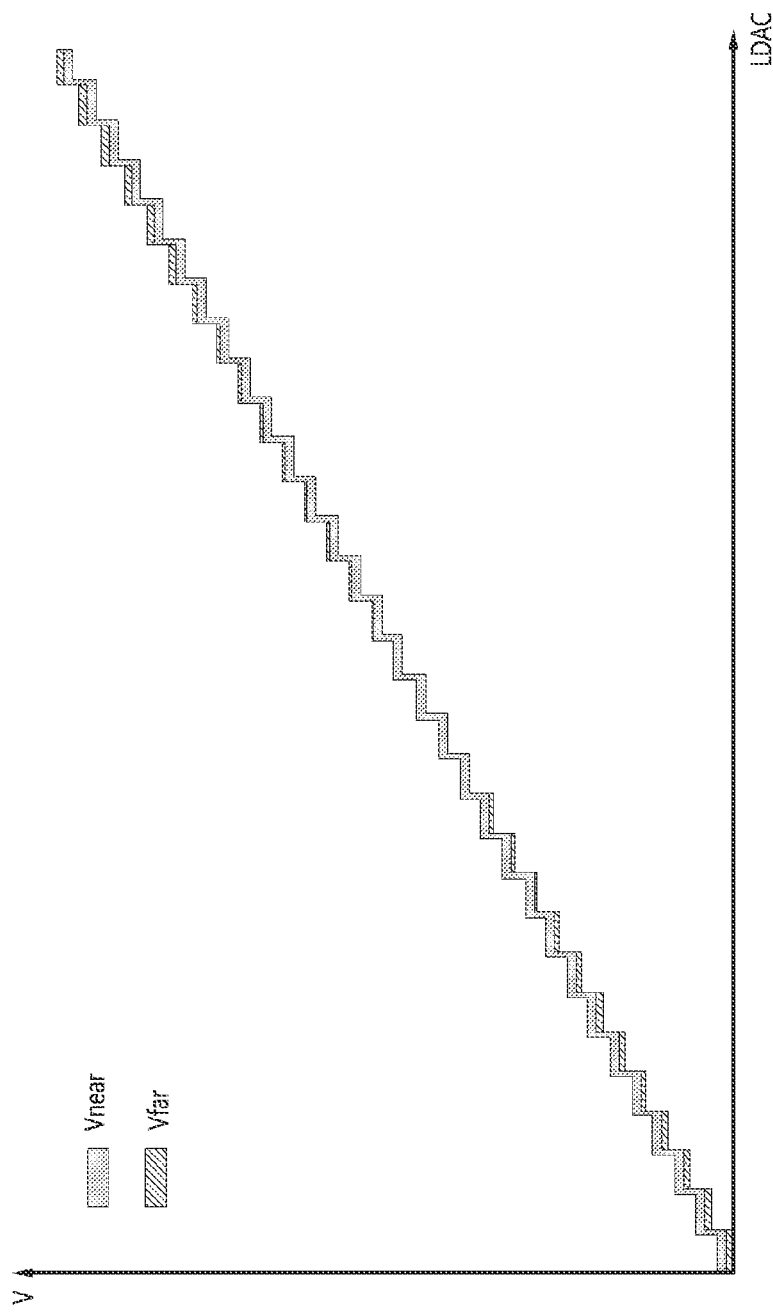

VOLTAGE GENERATION CIRCUIT AND SEMICONDUCTOR DEVICE USING THE SAME

CROSS-REFERENCES TO RELATED APPLICATION

The present application claims priority under 35 U.S.C. § 119(a) to Korean Patent Application No. 10-2023-0065023, filed on May 19, 2023, in the Korean Intellectual Property Office, which is incorporated herein by reference in its entirety.

BACKGROUND

1. Technical Field

The present technology relates to an integrated circuit technology, and more particularly, to a voltage generation circuit and a semiconductor device using the same.

2. Related Art

An electronic device includes many electronic components. Among the electronic components, a computer system may include many semiconductor devices made of a semiconductor. The semiconductor devices that constitute the computer system may communicate with each other by transmitting and/or receiving clocks and data. The semiconductor devices may each include a buffer and may receive a signal transmitted by an external device or may transmit or receive signals between circuits within the semiconductor device. The buffer may perform a differential amplification operation. The buffer may receive a differential signal and a single-ended signal and may require a reference voltage in order to amplify the single-ended signal. Accordingly, the semiconductor device may receive the reference voltage from the external device or may include a reference voltage generation circuit that is capable of internally generating the reference voltage.

SUMMARY

In an embodiment, a voltage generation circuit may include a global driver, a local driver, and a local voltage converter. The global driver may be configured to change the voltage level of a second voltage line by differentially amplifying the voltage level of a first boundary voltage and the voltage level of a first voltage line and configured to change the voltage level of a fourth voltage line by differentially amplifying the voltage level of a second boundary voltage and the voltage level of a third voltage line. The local driver may be configured to adjust the voltage level of the first voltage line based on the voltage level of the second voltage line and a bias voltage and configured to adjust the voltage level of the third voltage line based on the voltage level of the fourth voltage line and the bias voltage. The local voltage converter may be configured to generate an internal voltage having a voltage level between the voltage levels of the first and third voltage lines based on a local decoding signal.

In an embodiment, a semiconductor device may include a voltage generation circuit. The voltage generation circuit may include a global driver, a first local driver, a first local voltage converter, a second local driver, and a second local voltage converter. The global driver may be configured to change the voltage level of a second voltage line by differentially amplifying the voltage level of a first boundary voltage and the voltage level of a first voltage line and configured to change the voltage level of a fourth voltage line by differentially amplifying the voltage level of a second boundary voltage and the voltage level of a third voltage line. The first local driver may be configured to adjust the voltage level of the first voltage line based on the voltage level of the second voltage line, a bias voltage, and a first enable signal and configured to adjust the voltage level of the third voltage line based on the voltage level of the fourth voltage line, the bias voltage, and the first enable signal. The first local voltage converter may be configured to generate a first internal voltage having a voltage level between the voltage levels of the first and third voltage lines based on a first local decoding signal. The second local driver may be configured to adjust the voltage level of the first voltage line based on the voltage level of the second voltage line, the bias voltage, and a second enable signal and configured to adjust the voltage level of the third voltage line based on the voltage level of the fourth voltage line, the bias voltage, and the second enable signal. The second local voltage converter may be configured to generate a second internal voltage having a voltage level between the voltage levels of the first and third voltage lines based on the second local decoding signal.

In an embodiment, a voltage generation circuit may include a global driver, a local driver, and a local voltage converter. The global driver may be configured to output a first driving voltage having a constant voltage level to a second voltage line by differentially amplifying the voltage level of a first boundary voltage and the voltage level of a first voltage line and configured to output a second driving voltage having a constant voltage level to a fourth voltage line by differentially amplifying the voltage level of a second boundary voltage and the voltage level of a third voltage line. The local driver may be configured to adjust the voltage level of the first voltage line based on the first driving voltage and the bias voltage and configured to adjust the voltage level of the second voltage line based on the second driving voltage and the bias voltage. The local voltage converter may be configured to generate an internal voltage having a voltage level between the voltage levels of the first and third voltage lines based on a local decoding signal.

BRIEF DESCRIPTION OF THE DRAWINGS

FIG. 3 is a table illustrating characteristics of a voltage generation circuit according to the size of local resistors that constitute a local voltage converter.

FIGS. 8A and 8B are timing diagrams illustrating an operation of a voltage generation circuit according to an embodiment.

DETAILED DESCRIPTION

Figure 1:
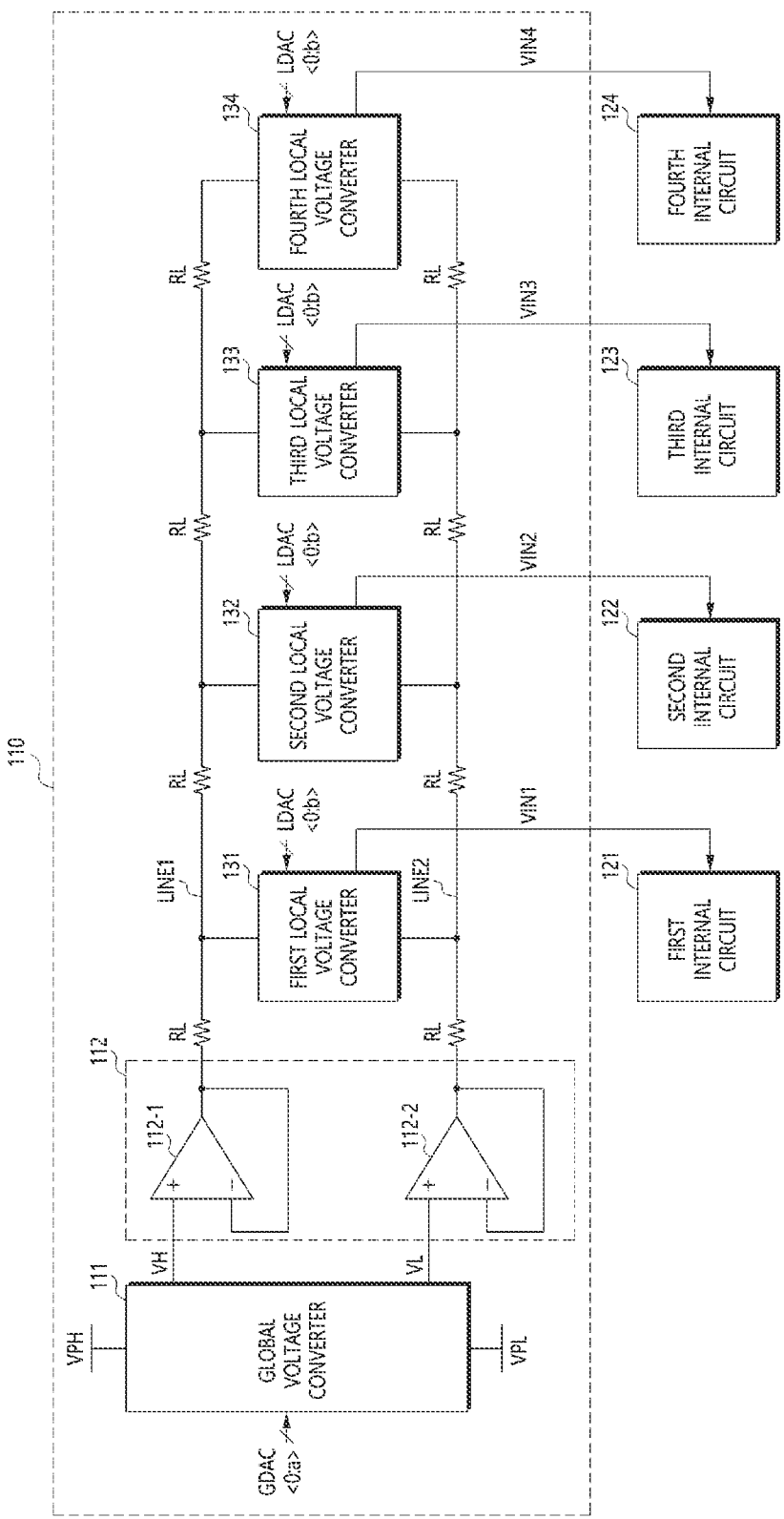
FIG. 1 is a diagram illustrating a construction of a semiconductor device according to an embodiment.

FIG. 1 is a diagram illustrating a construction of a semiconductor device 100 according to an embodiment. Referring to FIG. 1, the semiconductor device 100 may include a voltage generation circuit 110 and a plurality of internal circuits 121, 122, 123, and 124. The voltage generation circuit 110 may generate a plurality of internal voltages VIN1, VIN2, VIN3, and VIN4 that are used in the plurality of internal circuits 121, 122, 123, and 124, respectively. The voltage generation circuit 110 may generate the plurality of internal voltages by receiving a first power supply voltage VPH and a second power supply voltage VPL and may provide the plurality of internal voltages VIN1, VIN2, VIN3, and VIN4 to the plurality of internal circuits 121, 122, 123, and 124, respectively. The first power supply voltage VPH may have a higher voltage level than the second power supply voltage VPL. For example, the semiconductor device 100 may include a first internal circuit 121, a second internal circuit 122, a third internal circuit 123, and a fourth internal circuit 124. The first internal circuit 121 may be disposed at a first location, the second internal circuit 122 may be disposed at a second location, the third internal circuit 123 may be disposed at a third location, and the fourth internal circuit 124 may be disposed at a fourth location. The second location may be adjacent to the first location. The third location may be between the second location and the fourth location. The fourth location may be adjacent to the third location. In an embodiment, the first to fourth internal circuits 121, 122, 123, and 124 may perform the same type of function. For example, the first to fourth internal circuits 121, 122, 123, and 124 may be data input and output circuits that are coupled to different data transmission lines and perform data input and output operations.

The voltage generation circuit 110 may include a global voltage converter 111, a global driver 112, and a plurality of local voltage converters 131, 132, 133, and 134. The global voltage converter 111 and the global driver 112 may be a global voltage generation circuit. The plurality of local voltage converters 131, 132, 133, and 134 may be local voltage generation circuits, respectively. The global voltage converter 111 may receive the first power supply voltage VPH, the second power supply voltage VPL, and a global decoding signal GDAC<0: a>. The global decoding signal GDAC<0: a> may each include a plurality of bits. In GDAC<0: a>, "a" may be an integer equal to or greater than 1. The global voltage converter 111 may generate a first boundary voltage VH and a second boundary voltage VL having voltage levels between the first power supply voltage VPH and the second power supply voltage VPL based on the global decoding signal GDAC<0: a>. The first boundary voltage VH may have a higher voltage level than the second boundary voltage VL.

The global driver 112 may receive the first boundary voltage VH and the second boundary voltage VL from the global voltage converter 111. The global driver 112 may output the first boundary voltage VH to a first voltage line LINE1 by amplifying the voltage level of the first boundary voltage VH. The global driver 112 may output the second boundary voltage VL to a second voltage line LINE2 by amplifying the voltage level of the second boundary voltage VL. The global driver 112 may include a first voltage follower 112-1 and a second voltage follower 112-2. The first voltage follower 112-1 may output the first boundary voltage VH to the first voltage line LINE1 by amplifying the voltage levels of the first boundary voltage VH and the first voltage line LINE1. The second voltage follower 112-2 may output the second boundary voltage VL to the second voltage line LINE2 by amplifying the voltage levels of the second boundary voltage VL and the second voltage line LINE2. The distance from the global driver 112 to the first location may be the nearest. The distance from the global driver 112 to the fourth location may be the farthest.

The plurality of local voltage converters 131, 132, 133, and 134 may receive the first boundary voltage VH through the first voltage line LINE1 and may receive the second boundary voltage VL through the second voltage line LINE2. The plurality of local voltage converters 131, 132, 133, and 134 may generate the plurality of internal voltages VIN1, VIN2, VIN43, and VIN4, each having a voltage level between the first boundary voltage VH and the second boundary voltage VL, respectively. The plurality of local voltage converters 131, 132, 133, and 134 may each include a plurality of local resistors that are coupled in series between the first voltage line LINE1 and the second voltage line LINE2. Based on a local decoding signal LDAC<0: b>, the plurality of local voltage converters 131, 132, 133, and 134 may each output, as its internal voltage, one of a plurality of voltages that are output from nodes between the plurality of local resistors. The local decoding signal may include a plurality of bits. In LDAC<0: b>, "b" may be an integer equal to or greater than 1. The voltage generation circuit 110 may include the same number of local voltage converters as the number of plurality of internal circuits. For example, the voltage generation circuit 110 may include a first local voltage converter 131, a second local voltage converter 132, a third local voltage converter 133, and a fourth local voltage converter 134. The first local voltage converter 131 may be coupled to the first internal circuit 121 and may be disposed at the first location. The first local voltage converter 131 may be coupled to the first voltage line LINE1 and the second voltage line LINE2 and may receive the local decoding signal LDAC<0: b>. Based on the local decoding signal LDAC<0: b>, the first local voltage converter 131 may generate the first internal voltage VIN1 having a voltage level between the voltage level of the first voltage line LINE1 and the voltage level of the second voltage line LINE2. The second local voltage converter 132 may be coupled to the second internal circuit 122 and may be disposed at the second location. The second local voltage converter 132 may be coupled to the first voltage line LINE1 and the second voltage line LINE2 and may receive the local decoding signal LDAC<0: b>. Based on the local decoding signal LDAC<0: b>, the second local voltage converter 132 may generate the second internal voltage VIN2 having a voltage level between the voltage level of the first voltage line LINE1 and the voltage level of the second voltage line LINE2. The third local voltage converter 133 may be coupled to the third internal circuit 123 and may be disposed at the third location. The third local voltage converter 133 may be coupled to the first voltage line LINE1 and the second voltage line LINE2 and may receive the local decoding signal LDAC<0: b>. Based on the local decoding signal LDAC<0: b>, the third local voltage converter 133 may generate the third internal voltage VIN3 having a voltage level between the voltage level of the first voltage line LINE1 and the voltage level of the second voltage line LINE2. The fourth local voltage converter 134 may be coupled to the fourth internal circuit 124 and may be disposed at the fourth location. The fourth local voltage converter 134 may be coupled to the first voltage line LINE1 and the second voltage line LINE2 and may receive the local decoding signal LDAC<0: b>. Based on the local decoding signal LDAC<0: b>, the fourth local voltage converter 134 may generate the fourth internal voltage VIN4 having a voltage level between the voltage level of the first voltage line LINE1 and the voltage level of the second voltage line LINE2.

When the first to fourth local voltage converters 131, 132, 133, and 134 receive the local decoding signal LDAC<0: b>, in common, ideally, the first to fourth internal voltages VIN1, VIN2, VIN3, and VIN4 may have substantially the same voltage level. However, differences may occur between the voltage levels of the first to fourth internal voltages VIN1, VIN2, VIN3, and VIN4 because the distances from the global driver 112 to the first to fourth local voltage converters 131, 132, 133, and 134 are different. Line resistors RL may be present between the global driver 112 and the first local voltage converter 131. Line resistors RL may also be present between the first local voltage converter 131 and the second local voltage converter 132. Line resistors RL may be present between the second local voltage converter 132 and the third local voltage converter 133. Line resistors RL may also be present between the third local voltage converter 133 and the fourth local voltage converter 134. The first boundary voltage VH that is output by the first voltage follower 112-1 may drop through the line resistor RL. The level of a voltage that is received by the first to fourth local voltage converters 131, 132, 133, and 134 through the first voltage line LINE1 may gradually drop from the voltage level of the first boundary voltage VH. The second boundary voltage VL that is output by the second voltage follower 112-2 may drop through the line resistor RL. The level of a voltage that is received by the first to fourth local voltage converters 131, 132, 133, and 134 through the second voltage line LINE2 may gradually drop from the voltage level of the second boundary voltage VL.

Figure 2A:
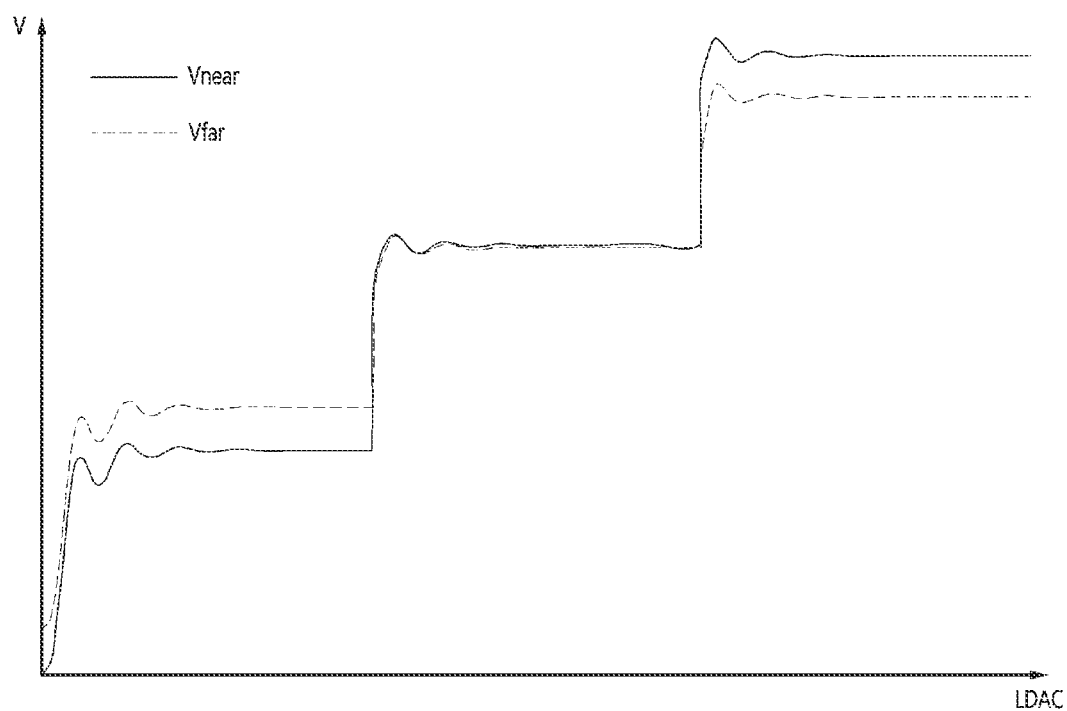
FIG. 2A is a diagram illustrating a change in the voltage level of an internal voltage according to a logic value of a local decoding signal.

FIG. 2A is a diagram illustrating the voltage level V of an internal voltage according to a logic value of a local decoding signal LDAC. In FIG. 2A, an x axis may be a logic value of the local decoding signal LDAC, and a y axis may be the voltage level V of the internal voltage. Referring to FIGS. 1 and 2A, when the logic value of the local decoding signal LDAC is between a small value and a middle value (i.e., when the internal voltage having a relatively low voltage level is generated), the voltage level of an internal voltage Vnear that is generated by a local voltage converter disposed relatively near the global driver 112 may be lower than the voltage level of an internal voltage Vfar that is generated by a local voltage converter disposed relatively far from the global driver 112. When the logic value of the local decoding signal LDAC has the middle value (i.e., when an internal voltage having a middle voltage level is generated), the voltage level of the internal voltage Vnear that is generated by a local voltage converter disposed relatively near the global driver 112 might not have a great difference from the voltage level of the internal voltage Vfar that is generated by a local voltage converter disposed relatively far from the global driver 112. When the logic value of the local decoding signal LDAC is between the middle value and a great value (i.e., when an internal voltage having a relatively high voltage level is generated), the voltage level of the internal voltage Vnear that is generated by a local voltage converter disposed relatively near the global driver 112 may be higher than the voltage level of the internal voltage Vfar that is generated by the local voltage converter disposed relatively far from the global driver 112.

Figure 2B:
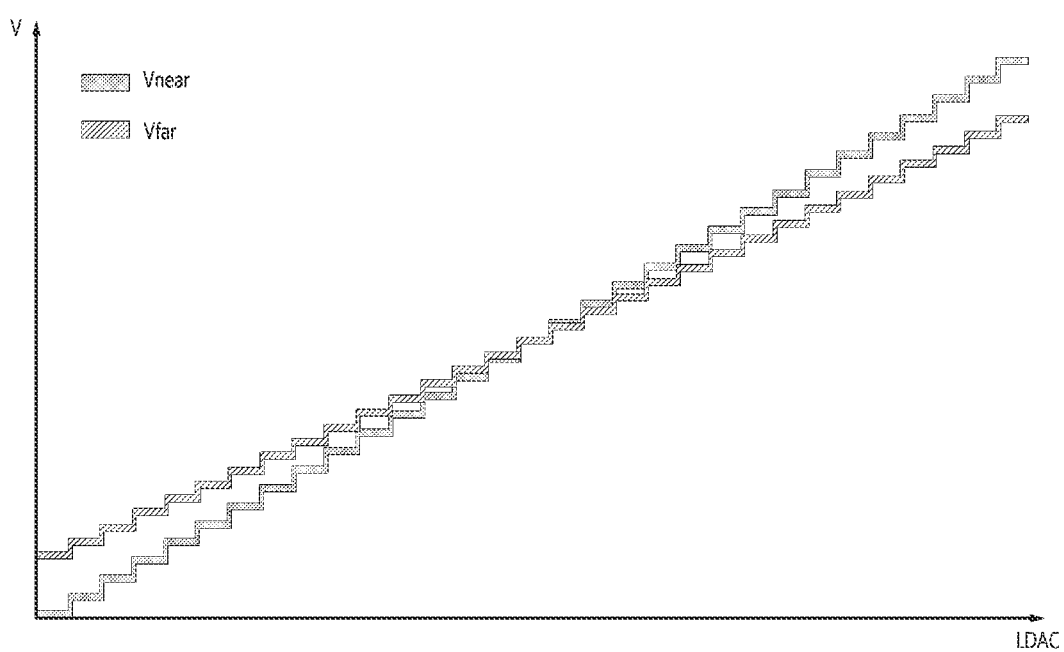
FIG. 2B is a diagram illustrating a stepwise change of the voltage level of the internal voltage according to a logic value of the local decoding signal.

FIG. 2B is a diagram illustrating a stepwise change of the voltage level V of an internal voltage according to a logic value of the local decoding signal LDAC. In FIG. 2B, an x axis may be the logic value of the local decoding signal LDAC, and a y axis may be the voltage level V of the internal voltage. Referring to FIGS. 1 and 2B, when the logic value of the local decoding signal LDAC increases from a minimum value to a maximum value, the voltage level of the internal voltage Vnear that is generated by a local voltage converter disposed relatively near the global driver 112 may have a relatively wide voltage range. In contrast, the voltage level of the internal voltage Vfar that is generated by a local voltage converter disposed relatively far from the global driver 112 may have a relatively narrow voltage range. As the logic value of the local decoding signal LDAC decreases (left side of the x axis), the voltage level of the internal voltage Vnear may be lower than the voltage level of the internal voltage Vfar. As the logic value of the local decoding signal LDAC increases (right side of the x axis), the voltage level of the internal voltage Vnear may be higher than the voltage level of the internal voltage Vfar. In FIG. 1, the levels of voltages that are received by the plurality of local voltage converters 131, 132, 133, and 134, respectively, through the first and second voltage lines LINE1 and LINE2 may be different from each other depending on the distances from the global driver 112. Differences may also occur between the voltage levels of the first to fourth internal voltages VIN1, VIN2, VIN3, and VIN4. Differences between the voltage levels of the first to fourth internal voltages VIN1, VIN2, VIN3, and VIN4 may prevent the first to fourth internal circuits 121, 122, 123, and 124 from exhibiting uniform performance. As a result, the reliability of the semiconductor device 100 may be reduced.

FIG. 3 is a table illustrating characteristics of the voltage generation circuit according to the size of the local resistors that constitute the local voltage converter. Referring to FIGS. 1 and 3, if the size of a plurality of local resistors that constitute the local voltage converter is increased, difference between the voltage level of an internal voltage that is generated by a local voltage converter disposed relatively near the global driver 112 and the voltage level of an internal voltage that is generated by a local voltage converter disposed relatively far from the global driver 112 can be reduced. For example, as the size of the local resistors is reduced, the difference between the first internal voltage VIN1 and the fourth internal voltage VIN4 may be increased. On the other hand, as the size of the local resistors is increased, the difference between the first internal voltage VIN1 and the fourth internal voltage VIN4 may be decreased. However, as the size of the local resistors is increased, the area of the local voltage converter may be increased and the time that is taken for an internal voltage to be settled may be increased. Accordingly, if the resistance values of the local resistors are increased, differences between the voltage levels of internal voltages that are generated by the plurality of local voltage converters may be decreased, but the area of the local voltage converters may be increased and the time taken for the internal voltages to be settled may be increased. As a result, it may be necessary to implement a voltage generation circuit capable that reduces the differences between the voltage levels of internal voltages that are generated by a plurality of local voltage converters while preventing an increase in the area of the local voltage converter and an increase in the time that is taken for the internal voltage to be settled.

Figure 4:
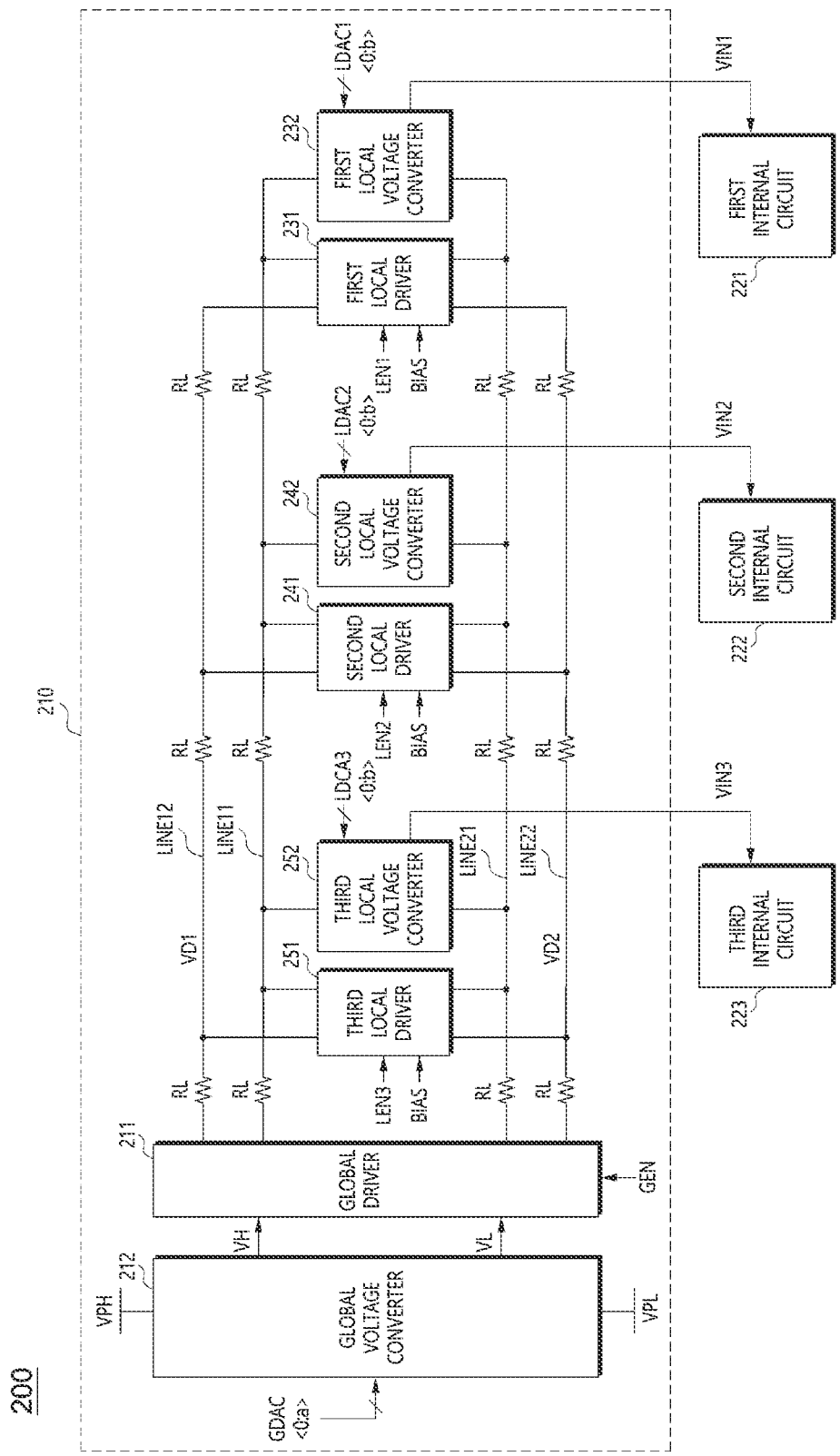
FIG. 4 is a diagram illustrating a construction of a semiconductor device according to an embodiment.

FIG. 4 is a diagram illustrating a construction of a semiconductor device 200 according to an embodiment. Referring to FIG. 4, the semiconductor device 200 may include a voltage generation circuit 210 and at least one internal circuit. The voltage generation circuit 210 may receive a first power supply voltage VPH and a second power supply voltage VPL and may generate at least one internal voltage that is used in the at least one internal circuit. The first power supply voltage VPH may have a higher voltage level than the second power supply voltage VPL. The at least one internal circuit may operate based on the at least one internal voltage. The semiconductor device 200 may include at least a first internal circuit 221. The voltage generation circuit 210 may generate at least a first internal voltage VIN1 and may provide the first internal voltage VIN1 to the first internal circuit 221. The first internal circuit 221 may operate based on the first internal voltage VIN1.

The voltage generation circuit may include a global driver 211, a first local driver 231, and a first local voltage converter 232. The global driver 211 may receive a first boundary voltage VH and a second boundary voltage VL. The first and second boundary voltages VH and VL may have voltage levels between the first power supply voltage VPH and the second power supply voltage VPL. The first boundary voltage VH may have a higher voltage level than the second boundary voltage VL. The global driver 211 may be coupled to a first voltage line LINE11, a second voltage line LINE12, a third voltage line LINE21, and a fourth voltage line LINE22. The global driver 211 may change the voltage level of the second voltage line LINE12 by differentially amplifying the voltage levels of the first boundary voltage VH and the first voltage line LINE11. The global driver 211 may output a first driving voltage VD1 through the second voltage line LINE12. The first driving voltage VD1 may have a voltage level that is complementary to the voltage level of the first boundary voltage VH. The global driver 211 may change the voltage level of the fourth voltage line LINE22 by differentially amplifying the voltage levels of the second boundary voltage VL and the third voltage line LINE21. The global driver 211 may output a second driving voltage VD2 through the fourth voltage line LINE22. The second driving voltage VD2 may have a voltage level that is complementary to the voltage level of the second boundary voltage VL.

The second and fourth voltage lines LINE12 and LINE22 may each be a voltage line that does not have a current path. A voltage drop of each of the second and fourth voltage lines LINE12 and LINE22 might not occur even though a line resistor RL is present in each of the second and fourth voltage lines LINE12 and LINE22. The first and third voltage lines LINE11 and LINE21 may each be a voltage line that supplies a power supply voltage that allows the first local voltage converter 232 to generate the first internal voltage VIN1. The global driver 211 can reduce and/or prevent a drop of the voltage level of each of the first and third voltage lines LINE11 and LINE21 because the global driver 211 adjusts the voltage levels of the first and third voltage lines LINE11 and LINE21 by supplying the first and second driving voltages VD1 and VD2, each one having a constant voltage level without a voltage drop, through the second and fourth voltage lines LINE12 and LINE22, respectively.

The first local driver 231 may be coupled to the first to fourth voltage lines LINE11, LIN12, LINE21, and LINE22. The first local driver 231 may receive a bias voltage BIAS. The first local driver 231 may adjust the voltage level of the first voltage line LINE11 based on the voltage level of the second voltage line LINE12 and the bias voltage BIAS. The first local driver 231 may adjust the voltage level of the third voltage line LINE21 based on the voltage level of the fourth voltage line LINE22 and the bias voltage BIAS. The first local voltage converter 232 may be coupled to the first and third voltage lines LINE11 and LINE21. The first local voltage converter 232 may receive a first local decoding signal LDAC1<0: b>. In LDAC1<0: b>, "b" may be an integer equal to or greater than 1. Based on the first local decoding signal LDAC1<0: b>, the first local voltage converter 232 may generate the first internal voltage VIN1 having a voltage level between the voltage levels of the first and third voltage lines LINE11 and LINE21. The first local voltage converter 232 may provide the first internal voltage VIN1 to the first internal circuit 221. The first internal circuit 221, the first local driver 231, and the first local voltage converter 232 may be disposed at a first location. The first location may be the farthest from the global driver 211. The first local driver 231 and the first local voltage converter 232 may constitute a first local voltage generation circuit.

The voltage generation circuit 210 may further include a global voltage converter 212. The global voltage converter 212 may receive the first power supply voltage VPH, the second power supply voltage VPL, and global decoding signal GDAC<0: a>. In GDAC<0: a>, "a" may be an integer equal to or greater than 1. Based on the global decoding signal GDAC<0: a>, the global voltage converter 212 may output two voltages, among a plurality of voltages, each having a voltage level between the first and second power supply voltages VPH and VPL, as the first and second boundary voltages VH and VL, respectively. The global voltage converter 212 may provide the first and second boundary voltages VH and VL to the global driver 211. The global voltage converter 212 and the global driver 211 may constitute a global voltage generation circuit.

The semiconductor device 200 may further include a second internal circuit 222 and a third internal circuit 223. The voltage generation circuit 210 may further generate a second internal voltage VIN2 and a third internal voltage VIN3. The voltage generation circuit 210 may provide the second internal voltage VIN2 to the second internal circuit 222. The second internal circuit 222 may operate based on the second internal voltage VIN2. The voltage generation circuit 210 may provide the third internal voltage VIN3 to the third internal circuit 223. The third internal circuit 223 may operate based on the third internal voltage VIN3. In an embodiment, the semiconductor device 200 may include the first to third internal circuits 221, 222, and 223. However, the number of internal circuits included in the semiconductor device 200 may be greater or smaller than 3. The number of internal voltages generated by the voltage generation circuit 210 may correspond to the number of internal circuits included in the semiconductor device 200.

The voltage generation circuit 210 may further include a second local driver 241, a second local voltage converter 242, a third local driver 251, and a third local voltage converter 252. The second local driver 241 and the second local voltage converter 242 may constitute a second local voltage generation circuit. The third local driver 251 and the third local voltage converter 252 may constitute a third local voltage generation circuit. The second local driver 241 may be coupled to the first to fourth voltage lines LINE11, LINE12, LINE21, and LINE22. The second local driver 241 may receive the bias voltage BIAS. The second local driver 241 may adjust the voltage level of the first voltage line LINE11 based on the voltage level of the second voltage line LINE12 and the bias voltage BIAS. The second local driver 241 may adjust the voltage level of the third voltage line LINE21 based on the voltage level of the fourth voltage line LINE22 and the bias voltage BIAS. The second local voltage converter 242 may be coupled to the first and third voltage lines LINE11 and LINE21. The second local voltage converter 242 may receive a second local decoding signal LDAC2<0: b>. The second local decoding signal LDAC2<0: b> may have the same logic values as the first local decoding signal LDAC1<0: b> and may have a logic value different from the logic value of the first local decoding signal LDAC1<0: b>. Based on the second local decoding signal LDAC2<0: b>, the second local voltage converter 242 may generate the second internal voltage VIN2 having a voltage level between the voltage levels of the first and third voltage lines LINE11 and LINE21. The second local voltage converter 242 may provide the second internal voltage VIN2 to the second internal circuit 222. The second internal circuit 222, the second local driver 241, and the second local voltage converter 242 may be disposed at a second location. The second location may be nearer to the global driver 211 than the first location.

The third local driver 251 may be coupled to the first to fourth voltage lines LINE11, LINE12, LINE21, and LINE22. The third local driver 251 may receive the bias voltage BIAS. The third local driver 251 may adjust the voltage level of the first voltage line LINE11 based on the voltage level of the second voltage line LINE12 and the bias voltage BIAS. The third local driver 251 may adjust the voltage level of the third voltage line LINE21 based on the voltage level of the fourth voltage line LINE22 and the bias voltage BIAS. The third local voltage converter 252 may be coupled to the first and third voltage lines LINE11 and LINE21. The third local voltage converter 252 may receive a third local decoding signal LDAC3<0: b>. The third local decoding signal LDAC3<0: b> may have the same logic value as at least one of the first and second local decoding signals LDAC1<0: b> and LDAC2<0: b> and may have logic values that are different from the logic values of the first and second local decoding signals LDAC1<0: b> and LDAC2<0: b>. Based on the third local decoding signal LDAC3<0: b>, the third local voltage converter 252 may generate the third internal voltage VIN3 having a voltage level between the voltage levels of the first and third voltage lines LINE11 and LINE21. The third local voltage converter 252 may provide the third internal voltage VIN3 to the third internal circuit 223. The third internal circuit 223, the third local driver 251, and the third local voltage converter 252 may be disposed at a third location. Among the first location, the second location, and the third location, the third location may be the nearest to the global driver. The second location may be halfway between the first location and the third location.

The voltage generation circuit 210 may preferentially activate a local driver that is farthest from the global driver 211 in order to generate the first to third internal voltages VIN1, VIN2, and VIN3. The first local driver 231 may further receive a first local enable signal LEN1. The first local driver 231 may be activated based on the first local enable signal LEN1. The second local driver 241 may further receive a second local enable signal LEN2. The second local driver 241 may be activated based on the second local enable signal LEN2. The third local driver 251 may further receive a third local enable signal LEN3. The third local driver 251 may be activated based on the third local enable signal LEN3. The first to third local enable signals LEN1, LEN2, and LEN3 may be selectively enabled.

The first local enable signal LEN1 may be preferentially enabled so that the first to third local voltage converters 232, 242, and 252 can generate the first to third internal voltages VIN1, VIN2, and VIN3. The second and third local enable signals LEN2 and LEN3 may be selectively enabled if necessary. When both the second and third local enable signals LEN2 and LEN3 are enabled, the second local enable signal LEN2 may be enabled earlier than the third local enable signal LEN3. The voltage generation circuit 210 may change the number of local enable signals that are enabled in order to adjust the times that are taken for the first to third internal voltages VIN1, VIN2, and VIN3 to be settled. The more the voltage generation circuit 210 enables a larger number of local enable signals, the more the times that are taken for the first to third internal voltages VIN1, VIN2, and VIN3 to be settled may be decreased. In an embodiment, the global driver 211 may further receive a global enable signal GEN. The global driver 211 may be activated based on the global enable signal GEN. The voltage generation circuit 210 may enable the global enable signal GEN in order to generate the first to third internal voltages VIN1, VIN2, and VIN3. The global enable signal GEN may be enabled earlier than the first local enable signal LEN1. In an embodiment, the global enable signal GEN may be enabled substantially at the same time with the first local enable signal LEN1.

Figure 5:
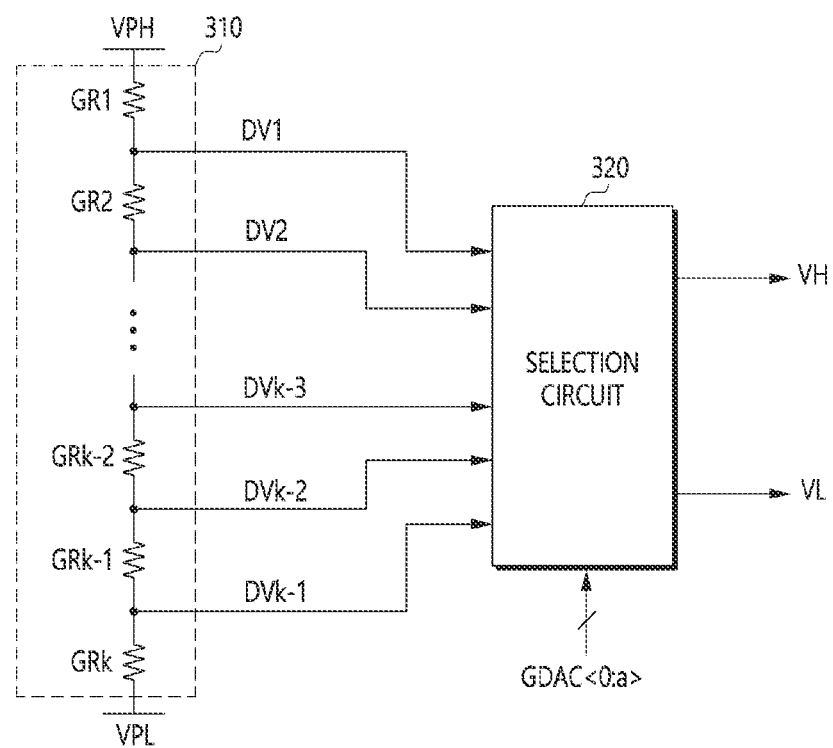
FIG. 5 is a diagram illustrating a construction of a global voltage converter illustrated in FIG. 4.

FIG. 5 is a diagram illustrating a construction of the global voltage converter 212, illustrated in FIG. 4. Referring to FIG. 5, the global voltage converter 212 may include a voltage division circuit 310 and a selection circuit 320. The voltage division circuit 310 may be coupled to a terminal to which the first power supply voltage VPH is supplied and a terminal to which the second power supply voltage VPL is supplied. The voltage division circuit 310 may include a plurality of global resistors GR1 to GRk. The plurality of global resistors GR1 to GRk may have the same resistance value. In an embodiment, some or all of the plurality of global resistors GR1 to GRk may have different resistance values. The plurality of global resistors GR1 to GRk may be coupled in series between the terminal to which the first power supply voltage VPH is supplied and the terminal to which the second power supply voltage VPL is supplied. The voltage division circuit 310 may output a plurality of divided voltages from nodes between the plurality of global resistors GR1 to GRk. For example, the voltage division circuit 310 may output a first divided voltage DV1 from a node between the first global resistor GR1 and the second global resistor GR2 and may output a second divided voltage DV2 from a node between the second global resistor GR2 and a third global resistor (not illustrated). The voltage division circuit 310 may output a (k−3)-th divided voltage DVk−3 from a node between a (k−3)-th global resistor (not illustrated) and a (k−2)-th global resistor GRk−2, output a (k−2)-th divided voltage DVk−2 from a node between the (k−2)-th global resistor GRk−2 and a (k−1)-th global resistor GRk−1, and output a (k−1)-th divided voltage DVk−1 from a node between the (k−1)-th global resistor GRk−1 and a k-th global resistor GRk. In this case, "k" may be an integer equal to or greater than 7. The selection circuit 320 may receive the plurality of divided voltages DV1, DV2, DVk−3, DVk−2, and DVk−1 from the voltage division circuit 310. The selection circuit 320 may receive the global decoding signal GDAC<0: a> and may select two divided voltages, among the plurality of divided voltages DV1, DV2, DVk−3, DVk−2, and DVk−1, based on the global decoding signal GDAC<0: a>. The selection circuit 320 may output a divided voltage having a higher voltage level, among the selected two divided voltages, as the first boundary voltage VH, and may output a divided voltage having a lower voltage level, among the selected two divided voltages, as the second boundary voltage VL.

Figure 6:
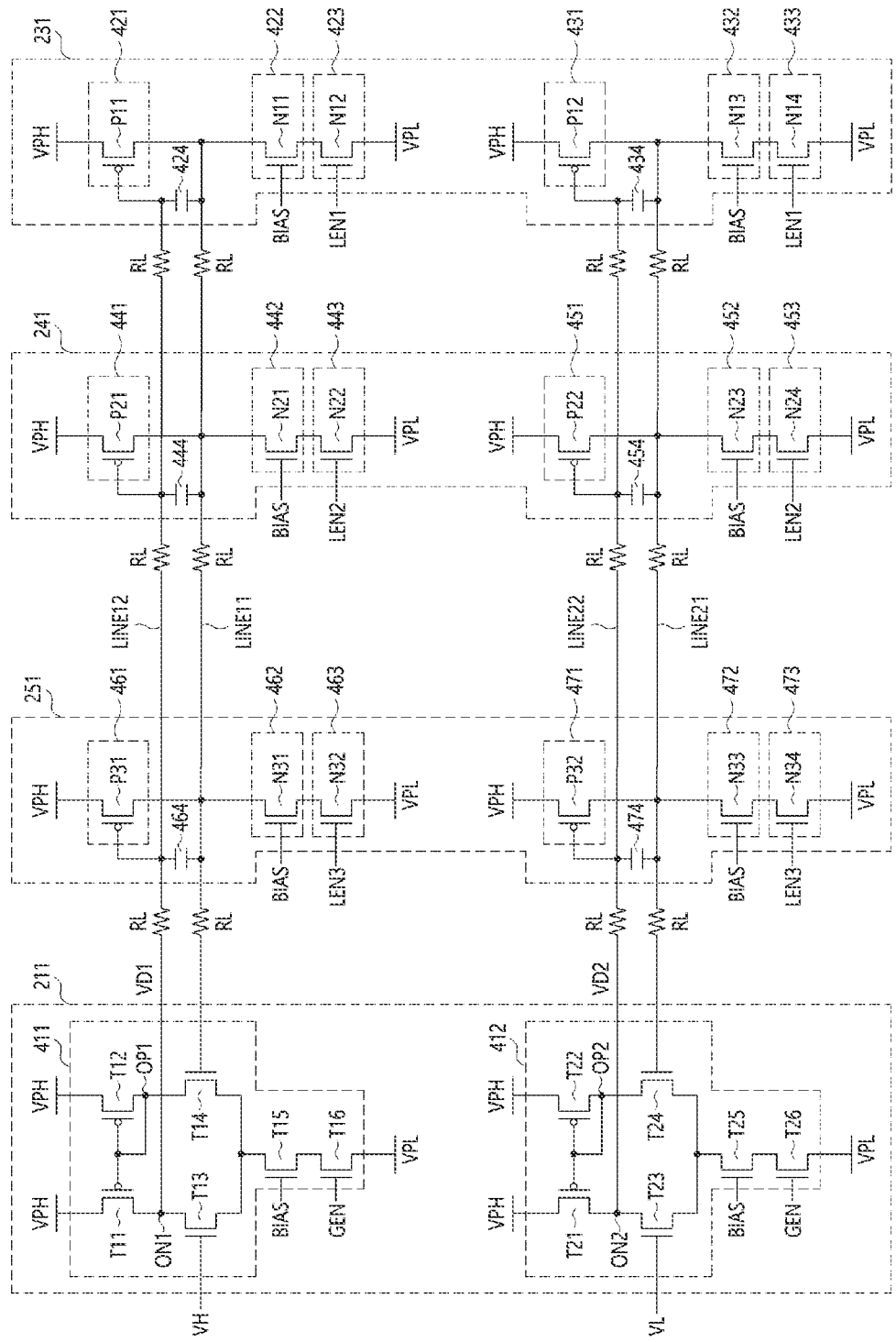
FIG. 6 is a diagram illustrating a construction of a global driver and first to third local drivers illustrated in FIG. 4 and a coupling relation between the global driver and the first to third local drivers.

FIG. 6 is a diagram illustrating a construction of the global driver 211 and the first to third local drivers 231, 241, and 251, illustrated in FIG. 4, and a coupling relation between the global driver 211 and the first to third local drivers 231, 241, and 251. Referring to FIG. 6, the global driver 211 may include a first differential amplifier 411 and a second differential amplifier 412. The first differential amplifier 411 may generate the first driving voltage VD1 by differentially amplifying the voltage levels of the first boundary voltage VH and the first voltage line LINE11 and may output the first driving voltage VD1 to the second voltage line LINE12. The second differential amplifier 412 may generate the second driving voltage VD2 by differentially amplifying the voltage levels of the second boundary voltage VL and the third voltage line LINE21 and may output the second driving voltage VD2 to the fourth voltage line LINE22.

The first differential amplifier 411 may include a first transistor T11, a second transistor T12, a third transistor T13, a fourth transistor T14, a fifth transistor T15, and a sixth transistor T16. The first and second transistors T11 and T12 may each be a P channel MOS transistor. The third to sixth transistors T13, T14, T15, and T16 may each be an N channel MOS transistor. The first transistor T11 may have a gate coupled to a positive output node OP1. A source of the first transistor T11 may receive the first power supply voltage VPH. The first transistor T11 may have a drain coupled to a negative output node ON1. The negative output node ON1 may be coupled to the second voltage line LINE12. The second transistor T12 may have a gate and a drain coupled to the positive output node OP1. A source of the second transistor T12 may receive the first power supply voltage VPH. A gate of the third transistor T13 may receive the first boundary voltage VH. The third transistor T13 may have a drain coupled to the second voltage line LINE12 through the negative output node ON1. The fourth transistor T14 may have a gate coupled to the first voltage line LINE11 and may have a drain coupled to the positive output node OP1. A gate of the fifth transistor T15 may receive the bias voltage BIAS. The fifth transistor T15 may have a drain coupled to the sources of the third and fourth transistors T13 and T14 in common. A gate of the sixth transistor T16 may receive the global enable signal GEN. The sixth transistor T16 may have a drain coupled to a source of the fifth transistor T15. A source of the sixth transistor T16 may receive the second power supply voltage VPL. The first differential amplifier 411 may output the first driving voltage VD1 to the second voltage line LINE12 through the negative output node ON1. The first differential amplifier 411 may generate the first driving voltage VD1 having a voltage level that is changed complementarily to the voltage level of the first boundary voltage VH between the first and second power supply voltages VPH and VPL.

The second differential amplifier 412 may include a first transistor T21, a second transistor T22, a third transistor T23, a fourth transistor T24, a fifth transistor T25, and a sixth transistor T26. The first and second transistors T21 and T22 may each be a P channel MOS transistor. The third to sixth transistors T23, T24, T25, and T26 may each be an N channel MOS transistor. The first transistor T21 may have a gate coupled to a positive output node OP2. A source of the first transistor T21 may receive the first power supply voltage VPH. The first transistor T21 may have a drain coupled to a negative output node ON2. The negative output node ON2 may be coupled to the fourth voltage line LINE22. The second transistor T22 may have a gate and a drain coupled to the positive output node OP2. A source of the second transistor T22 may receive the first power supply voltage VPH. A gate of the third transistor T23 may receive the second boundary voltage VL. The third transistor T23 may have a drain coupled to the fourth voltage line LINE22 through the negative output node ON2. The fourth transistor T24 may have a gate coupled to the third voltage line LINE21 and may have a drain coupled to the positive output node OP2. A gate of the fifth transistor T25 may receive the bias voltage BIAS. The fifth transistor T25 may have a drain coupled to sources of the third and fourth transistors T23 and T24 in common. A gate of the sixth transistor T26 may receive the global enable signal GEN. The sixth transistor T26 may have a drain coupled to a source of the fifth transistor T25. A source of the sixth transistor T26 may receive the second power supply voltage VPL. The second differential amplifier 412 may output the second driving voltage VD2 to the fourth voltage line LINE22 through the negative output node ON2. The second differential amplifier 412 may generate the second driving voltage VD2 having a voltage level that is changed complementarily to the voltage level of the second boundary voltage VL between the first and second power supply voltages VPH and VPL.

The first local driver 231 may include a first pull-up driver 421, a first pull-down driver 422, a second pull-up driver 431, and a second pull-down driver 432. The first pull-up driver 421 may be coupled to the second voltage line LINE12 and may receive the first driving voltage VD1. The first pull-up driver 421 may be coupled to the terminal to which the first power supply voltage VPH is supplied and may drive the first voltage line LINE11 at the voltage level of the first power supply voltage VPH by applying the first power supply voltage VPH to the first voltage line LINE11 based on the first driving voltage VD1. The first pull-down driver 422 may receive the bias voltage BIAS and may be coupled to the first voltage line LINE11 and the terminal to which the second power supply voltage VPL is supplied. Based on the bias voltage BIAS, the first pull-down driver 422 may adjust the amount of current that flows from the first voltage line LINE11 to the terminal to which the second power supply voltage VPL is supplied. The second pull-up driver 431 may be coupled to the fourth voltage line LINE22 and may receive the second driving voltage VD2. Based on the second driving voltage VD2, the second pull-up driver 431 may be coupled to the terminal to which the first power supply voltage VPH is supplied and may drive the third voltage line LINE21 to the voltage level of the first power supply voltage VPH by applying the first power supply voltage VPH to the third voltage line LINE21. The second pull-down driver 432 may receive the bias voltage BIAS and may be coupled to the third voltage line LINE21 and the terminal to which the second power supply voltage VPL is supplied. Based on the bias voltage BIAS, the second pull-down driver 432 may adjust the amount of current that flows from the third voltage line LINE21 to the terminal to which the second power supply voltage VPL is supplied.

The first local driver 231 may further include a first switch 423 and a second switch 433. The first switch 423 may receive the first local enable signal LEN1 and may be coupled between the first pull-down driver 422 and the terminal to which the second power supply voltage VPL is supplied. When the first local enable signal LEN1 is enabled, the first switch 423 may form a current path between the first pull-down driver 422 and the terminal to which the second power supply voltage VPL is supplied. The second switch 433 may receive the first local enable signal LEN1 and may be coupled between the second pull-down driver 432 and the terminal to which the second power supply voltage VPL is supplied. When the first local enable signal LEN1 is enabled, the second switch 433 may form a current path between the second pull-down driver 432 and the terminal to which the second power supply voltage VPL is supplied. When the first local enable signal LEN1 is enabled, the first and second switches 423 and 433 may activate the first local driver 231. The first local driver 231 may further include a first capacitor 424 and a second capacitor 434. The first capacitor 424 may be coupled between the first voltage line LINE11 and the second voltage line LINE12. The second capacitor 434 may be coupled between the third voltage line LINE21 and the fourth voltage line LINE22. The first and second capacitors 424 and 434 can reduce an oscillation phenomenon and operation instability, which may occur due to the shortage of a phase margin, in the first and second differential amplifiers 411 and 412.

The first pull-up driver 421 may include a first transistor P11. The first transistor P11 may be a P channel MOS transistor. The first transistor P11 may have a gate coupled to the second voltage line LINE12 and may receive the first driving voltage VD1 through the gate. A source of the first transistor P11 may receive the first power supply voltage VPH. The first transistor P11 may have a drain coupled to the first voltage line LINE11. The first pull-down driver 422 may include a second transistor N11. A gate of the second transistor N11 may receive the bias voltage BIAS. The second transistor N11 may have a drain coupled to the first voltage line LINE11. The first switch 423 may include a third transistor N12. The third transistor N12 may be an N channel MOS transistor. A gate of the third transistor N12 may receive the first local enable signal LEN1. The third transistor N12 may have a drain coupled to a source of the second transistor N11. A source of the third transistor N12 may receive the second power supply voltage VPL.

The second pull-up driver 431 may include a fourth transistor P12. The fourth transistor P12 may be a P channel MOS transistor. The fourth transistor P12 may have a gate coupled to the fourth voltage line LINE22 and may receive the second driving voltage VD2 through the gate. A source of the fourth transistor P12 may receive the first power supply voltage VPH. The fourth transistor P12 may have a drain coupled to the third voltage line LINE21. The second pull-down driver 432 may include a fifth transistor N13. A gate of the fifth transistor N13 may receive the bias voltage BIAS. The fifth transistor N13 may have a drain coupled to the third voltage line LINE21. The second switch 433 may include a sixth transistor N14. The sixth transistor N14 may be an N channel MOS transistor. A gate of the sixth transistor N14 may receive the first local enable signal LEN1. The sixth transistor N14 may have a drain coupled to a source of the fifth transistor N13. A source of the sixth transistor N14 may receive the second power supply voltage VPL.

The second local driver 241 may include a first pull-up driver 441, a first pull-down driver 442, a second pull-up driver 451, and a second pull-down driver 452. The first pull-up driver 441 may be coupled to the second voltage line LINE12 and may receive the first driving voltage VD1. Based on the first driving voltage VD1, the first pull-up driver 441 may be coupled to the terminal to which the first power supply voltage VPH is supplied and may drive the first voltage line LINE11 to the voltage level of the first power supply voltage VPH by applying the first power supply voltage VPH to the first voltage line LINE11. The first pull-down driver 442 may receive the bias voltage BIAS and may be coupled to the first voltage line LINE11 and the terminal to which the second power supply voltage VPL is supplied. Based on the bias voltage BIAS, the first pull-down driver 442 may adjust the amount of current that flows from the first voltage line LINE11 to the terminal to which the second power supply voltage VPL is supplied. The second pull-up driver 451 may be coupled to the fourth voltage line LINE22 and may receive the second driving voltage VD2. Based on the second driving voltage VD2, the second pull-up driver 451 may be coupled to the terminal to which the first power supply voltage VPH is supplied and may drive the third voltage line LINE21 at the voltage level of the first power supply voltage VPH by applying the first power supply voltage VPH to the third voltage line LINE21. The second pull-down driver 452 may receive the bias voltage BIAS and may be coupled to the third voltage line LINE21 and the terminal to which the second power supply voltage VPL is supplied. Based on the bias voltage BIAS, the second pull-down driver 452 may adjust the amount of current that flows from the third voltage line LINE21 to the terminal to which the second power supply voltage VPL is supplied.

The first local driver 241 may further include a first switch 443 and a second switch 453. The first switch 443 may receive the second local enable signal LEN2 and may be coupled between the first pull-down driver 442 and the terminal to which the second power supply voltage VPL is supplied. When the second local enable signal LEN2 is enabled, the first switch 443 may form a current path between the first pull-down driver 442 and the terminal to which the second power supply voltage VPL is supplied. The second switch 453 may receive the second local enable signal LEN2 and may be coupled between the second pull-down driver 452 and the terminal to which the second power supply voltage VPL is supplied. When the second local enable signal LEN2 is enabled, the second switch 453 may form a current path between the second pull-down driver 452 and the terminal to which the second power supply voltage VPL is supplied. When the second local enable signal LEN2 is enabled, the first and second switches 443 and 453 may activate the second local driver 241. The second local driver 241 may further include a first capacitor 444 and a second capacitor 454. The first capacitor 444 may be coupled between the first voltage line LINE11 and the second voltage line LINE12. The second capacitor 454 may be coupled between the third voltage line LINE21 and the fourth voltage line LINE22.

The first pull-up driver 441 may include a first transistor P21. The first transistor P21 may be a P channel MOS transistor. The first transistor P21 may have a gate coupled to the second voltage line LINE12 and may receive the first driving voltage VD1 through the gate. A source of the first transistor P21 may receive the first power supply voltage VPH. The first transistor P21 may have a drain coupled to the first voltage line LINE11. The first pull-down driver 442 may include a second transistor N21. A gate of the second transistor N21 may receive the bias voltage BIAS. The second transistor N21 may have a drain coupled to the first voltage line LINE11. The first switch 443 may include a third transistor N22. The third transistor N22 may be an N channel MOS transistor. A gate of the third transistor N22 may receive the second local enable signal LEN2. The third transistor N22 may have a drain coupled to a source of the second transistor N21. A source of the third transistor N22 may receive the second power supply voltage VPL.

The second pull-up driver 451 may include a fourth transistor P22. The fourth transistor P22 may be a P channel MOS transistor. The fourth transistor P22 may have a gate coupled to the fourth voltage line LINE22 and may receive the second driving voltage VD2 through the gate. A source of the fourth transistor P22 may receive the first power supply voltage VPH. The fourth transistor P22 may have a drain coupled to the third voltage line LINE21. The second pull-down driver 452 may include a fifth transistor N23. A gate of the fifth transistor N23 may receive the bias voltage BIAS. The fifth transistor N23 may have a drain coupled to the third voltage line LINE21. The second switch 453 may include a sixth transistor N24. The sixth transistor N24 may be an N channel MOS transistor. A gate of the sixth transistor N24 may receive the second local enable signal LEN2. The sixth transistor N24 may have a drain coupled to a source of the fifth transistor N23. A source of the sixth transistor N24 may receive the second power supply voltage VPL.

The third local driver 251 may include a first pull-up driver 461, a first pull-down driver 462, a second pull-up driver 471, and a second pull-down driver 472. The first pull-up driver 461 may be coupled to the second voltage line LINE12 and may receive the first driving voltage VD1. Based on the first driving voltage VD1, the first pull-up driver 461 may be coupled to the terminal to which the first power supply voltage VPH is supplied and may drive the first voltage line LINE11 to the voltage level of the first power supply voltage VPH by applying the first power supply voltage VPH to the first voltage line LINE11. The first pull-down driver 462 may receive the bias voltage BIAS and may be coupled to the first voltage line LINE11 and the terminal to which the second power supply voltage VPL is supplied. Based on the bias voltage BIAS, the first pull-down driver 462 may adjust the amount of current that flows from the first voltage line LINE11 to the terminal to which the second power supply voltage VPL is supplied. The second pull-up driver 471 may be coupled to the fourth voltage line LINE22 and may receive the second driving voltage VD2. Based on the second driving voltage VD2, the second pull-up driver 471 may be coupled to the terminal to which the first power supply voltage VPH is supplied and may drive the third voltage line LINE21 to the voltage level of the first power supply voltage VPH by applying the first power supply voltage VPH to the third voltage line LINE21. The second pull-down driver 472 may receive the bias voltage BIAS and may be coupled to the third voltage line LINE21 and the terminal to which the second power supply voltage VPL is supplied. Based on the bias voltage BIAS, the second pull-down driver 472 may adjust the amount of current that flows from the third voltage line LINE21 to the terminal to which the second power supply voltage VPL is supplied.

The third local driver 251 may further include a first switch 463 and a second switch 473. The first switch 463 may receive the third local enable signal LEN3 and may be coupled between the first pull-down driver 462 and the terminal to which the second power supply voltage VPL is supplied. When the third local enable signal LEN3 is enabled, the first switch 463 may form a current path between the first pull-down driver 462 and the terminal to which the second power supply voltage VPL is supplied. The second switch 473 may receive the third local enable signal LEN3 and may be coupled between the second pull-down driver 472 and the terminal to which the second power supply voltage VPL is supplied. When the third local enable signal LEN3 is enabled, the second switch 473 may form a current path between the second pull-down driver 472 and the terminal to which the second power supply voltage VPL is supplied. When the third local enable signal LEN3 is enabled, the first and second switches 463 and 473 may activate the third local driver 251. The third local driver 251 may further include a first capacitor 464 and a second capacitor 474. The first capacitor 464 may be coupled between the first voltage line LINE11 and the second voltage line LINE12. The second capacitor 474 may be coupled between the third voltage line LINE21 and the fourth voltage line LINE22.

The first pull-up driver 461 may include a first transistor P31. The first transistor P31 may be a P channel MOS transistor. The first transistor P31 may have a gate coupled to the second voltage line LINE12 and may receive the first driving voltage VD1 through the gate. A source of the first transistor P31 may receive the first power supply voltage VPH. The first transistor P31 may have a drain coupled to the first voltage line LINE11. The first pull-down driver 462 may include a second transistor N31. A gate of the second transistor N31 may receive the bias voltage BIAS. The second transistor N31 may have a drain coupled to the first voltage line LINE11. The first switch 463 may include a third transistor N32. The third transistor N32 may be an N channel MOS transistor. A gate of the third transistor N32 may receive the third local enable signal LEN3. The third transistor N32 may have a drain coupled to a source of the second transistor N31. A source of the third transistor N32 may receive the second power supply voltage VPL.

The second pull-up driver 471 may include a fourth transistor P32. The fourth transistor P32 may be a P channel MOS transistor. The fourth transistor P32 may have a gate coupled to the fourth voltage line LINE22 and may receive the second driving voltage VD2 through the gate. A source of the fourth transistor P32 may receive the first power supply voltage VPH. The fourth transistor P32 may have a drain coupled to the third voltage line LINE21. The second pull-down driver 472 may include a fifth transistor N33. A gate of the fifth transistor N33 may receive the bias voltage BIAS. The fifth transistor N33 may have a drain coupled to the third voltage line LINE21. The second switch 473 may include a sixth transistor N34. The sixth transistor N34 may be an N channel MOS transistor. A gate of the sixth transistor N34 may receive the third local enable signal LEN3. The sixth transistor N34 may have a drain coupled to a source of the fifth transistor N33. A source of the sixth transistor N34 may receive the second power supply voltage VPL.

Figure 7:
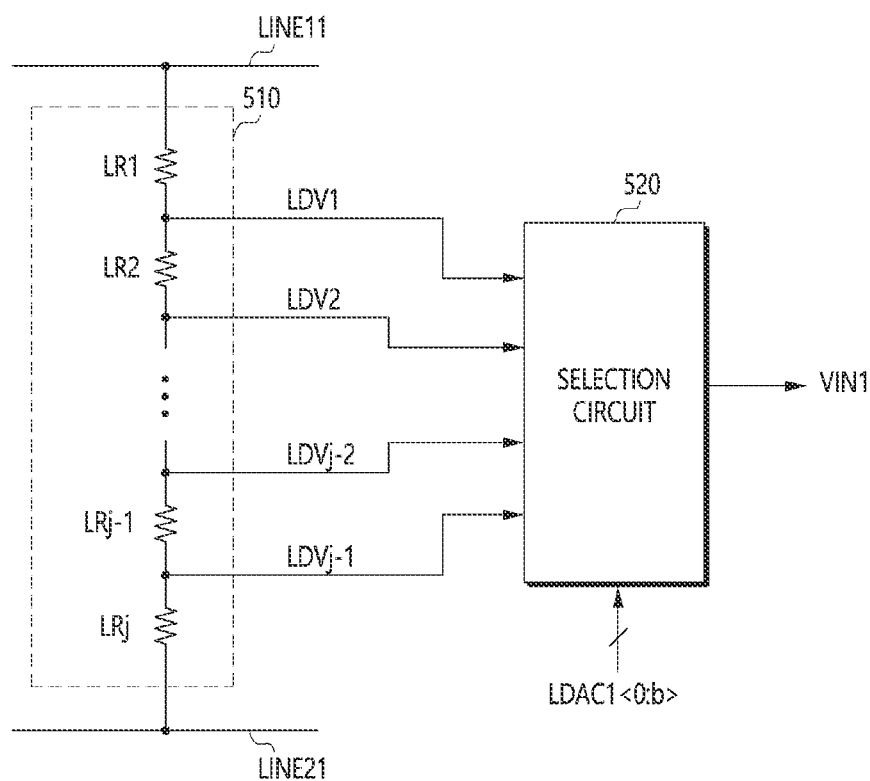
FIG. 7 is a diagram illustrating a construction of a first local voltage converter illustrated in FIG. 4.

FIG. 7 is a diagram illustrating a construction of the first local voltage converter 232, illustrated in FIG. 4. Referring to FIG. 7, the first local voltage converter 232 may include a voltage division circuit 510 and a selection circuit 520. The voltage division circuit 510 may be coupled between the first voltage line LINE11 and the third voltage line LINE21. The voltage division circuit 510 may include a plurality of local resistors LR1 to LRj. The plurality of local resistors LR1 to LRj may have the same resistance value. In an embodiment, some or all of the plurality of local resistors LR1 to LRj may have different resistance values. The plurality of local resistors LR1 to LRj may be coupled in series between the first voltage line LINE11 and the third voltage line LINE21. The voltage division circuit 510 may output a plurality of divided voltages from nodes between the local resistors LR1 to LRj. For example, the voltage division circuit 510 may output a first divided voltage LDV1 from a node between a first local resistor LR1 and a second local resistor LR2 and may output a second divided voltage LDV2 from a node between the second local resistor LR2 and a third local resistor (not illustrated). The voltage division circuit 510 may output a (j−2)-th divided voltage LDVj−2 from a node between a (j−2)-th local resistor (not illustrated) and a (j−1)-th local resistor LRj−1, and may output a (j−1)-th divided voltage LDVj−1 from a node between the (j−1)-th local resistor LRj−1 and a j-th local resistor LRj. In this case, j may be an integer equal to or greater than 6. The selection circuit 520 may receive the plurality of divided voltages LDV1, LDV2, LDVj−2, and LDVj−1 from the voltage division circuit 510. The selection circuit 520 may receive the first local decoding signal LDAC1<0: b> and may select one of the plurality of divided voltages LDV1, LDV2, LDVj−2, and LDVj−1 based on the first local decoding signal LDAC1<0: b>. The selection circuit 520 may output the selected divided voltage as the first internal voltage VIN1. The second local voltage converter 242 may have substantially the same construction as the first local voltage converter 232 except that the second local voltage converter 242 receives the second local decoding signal LDAC2<0: b> instead of the first local decoding signal LDAC1<0: b> and outputs the second internal voltage VIN2 instead of the first internal voltage VIN1. The third local voltage converter 252 may have substantially the same construction as the first local voltage converter 232 except that the third local voltage converter 252 receives the third local decoding signal LDAC3<0: b> instead of the first local decoding signal LDAC1<0: b> and outputs the third internal voltage VIN3 instead of the first internal voltage VIN1.

Figure 8B:
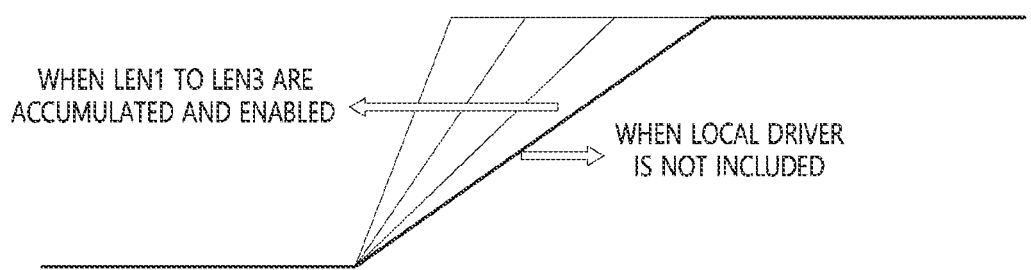

FIGS. 8A and 8B are timing diagrams illustrating an operation of the voltage generation circuit 210 according to an embodiment. Operations of the voltage generation circuit 210 and the semiconductor device 200 according to an embodiment may be described as follows with reference to FIGS. 4, 5, 6, 7, 8A, and 8B. The voltage generation circuit 210 may enable the global enable signal GEN in order to generate the first to third internal voltages VIN1, VIN2, and VIN3. The global voltage converter 212 may output the first and second boundary voltages VH and VL based on the global decoding signal GDAC<0: a>. The first differential amplifier 411 of the global driver 211 may output the first driving voltage VD1 to the second voltage line LINE12 by differentially amplifying the voltage levels of the first boundary voltage VH and the first voltage line LINE11. The first driving voltage VD1 may have a voltage level that is complementary to the voltage level of the first boundary voltage VH. The second differential amplifier 412 may output the second driving voltage VD2 to the fourth voltage line LINE22 by differentially amplifying the voltage levels of the second boundary voltage VL and the third voltage line LINE21. The second driving voltage VD2 may have a voltage level that is complementary to the voltage level of the second boundary voltage VL. The voltage generation circuit 210 may preferentially enable the first local enable signal LEN1. When the first local enable signal LEN1 is enabled, the first local driver 231 may be activated. The first pull-up driver 421 may pull-up drive the voltage level of the second voltage line LINE12 by providing the first power supply voltage VPH to the second voltage line LINE12 based on the voltage level of the first driving voltage VD1, based on the bias voltage BIAS, the first pull-down driver 422 may make a predetermined current flow from the second voltage line LINE12 to the terminal to which the second power supply voltage VPL is supplied. The second and fourth voltage lines LINE12 and LINE22 may be voltage lines in which a current path is not present because the second and fourth voltage lines LINE12 and LINE22 are coupled to the gates of the P channel MOS transistors P11, P12, P21, P22, P31, and P32 that constitute the pull-up drivers 421, 431, 441, 451, 461, and 471 of the first to third local drivers 231, 241, and 251. Accordingly, although the line resistor RL is present in the second and fourth voltage lines LINE12 and LINE22, a voltage drop of the first driving voltage VD1 and the second driving voltage VD2 might not occur until the first driving voltage VD1 and the second driving voltage VD2 are transmitted from the global driver 211 to the first to third local drivers 231, 241, and 251. As a result, the voltage level of the second voltage line LINE12 can be settled as the complementary voltage level of the first boundary voltage VH, and the voltage level of the first voltage line LINE11 can be settled as a voltage level corresponding to the voltage level of the first boundary voltage VH. Likewise, the voltage level of the fourth voltage line LINE22 can be settled as the complementary voltage level of the second boundary voltage VL, and the voltage level of the third voltage line LINE21 can be settled as a voltage level corresponding to the voltage level of the second boundary voltage VL. The first local driver 231 may maintain the second voltage line LINE12 to the complementary voltage level of the first boundary voltage VH and may maintain the first voltage line LINE11 to a voltage level corresponding to the voltage level of the first boundary voltage VH. The first local driver 231 may maintain the fourth voltage line LINE22 to the complementary voltage level of the second boundary voltage VL and may maintain the third voltage line LINE21 to a voltage level corresponding to the second boundary voltage VL. Despite the line resistors RL of the first and third voltage lines LINE11 and LINE21, it is possible to reduce and/or prevent a difference between the voltage levels of voltages that are supplied to the first to third local voltage converters 231, 241, and 251 through the first and third voltage lines LINE11 and LINE21. The first to third local voltage converters 231, 241, and 251 may receive a voltage having substantially the same voltage level (i.e., a voltage level corresponding to the first boundary voltage VH) through the first voltage line LINE11 and may receive a voltage having substantially the same voltage level (i.e., a voltage level corresponding to the second boundary voltage VL) through the third voltage line LINE21. Accordingly, differences between the voltage levels of the first to third internal voltages VIN1, VIN2, and VIN3 that are generated by the first to third local voltage converters 231, 241, and 251 can be reduced.

Referring to FIG. 8A, in FIG. 8A, an x axis may be a logic value of the local decoding signal LDAC, and a y axis may be the voltage level of an internal voltage V. Referring to FIGS. 4 and 8A, although the logic value of the local decoding code LDAC is increased from the smallest value to the greatest value, a great difference might not occur between the voltage level of an internal voltage Vnear that is generated by a local voltage converter disposed nearest to the global driver 211 and the voltage level of an internal voltage Vfar that is generated by a local voltage converter disposed farthest from the global driver 211. The first to third internal circuits 221, 222, and 223 can exhibit uniform performance when receiving the first to third internal voltages VIN1, VIN2, and VIN3 that rarely have differences, respectively, because the first to third internal circuits 221, 222, and 223 are circuits that perform the same type of function.

The voltage generation circuit 210 may enable at least one of the second local enable signal LEN2 and the third local enable signal LEN3 in order to reduce the times that are taken for the first to third internal voltages VIN1, VIN2, and VIN3 to be settled. When the second and third local enable signals LEN2 and LEN3 are enabled, the second and third local drivers 241 and 251 may be activated. The second and third local drivers 241 and 251 can settle and maintain the first voltage line LINE11 to a voltage level corresponding to the voltage level of the first boundary voltage VH along with the first local driver 231 and can settle and maintain the third voltage line LINE21 to a voltage level corresponding to the voltage level of the second boundary voltage VL. As illustrated in FIG. 8B, as the number of local drivers enabled is increased, the voltage level of the internal voltage VIN that is generated by the voltage generation circuit 210 may rise to a target voltage level Vtarget more rapidly, and the time taken for the internal voltage VIN to be settled may be reduced.

Figure 9:
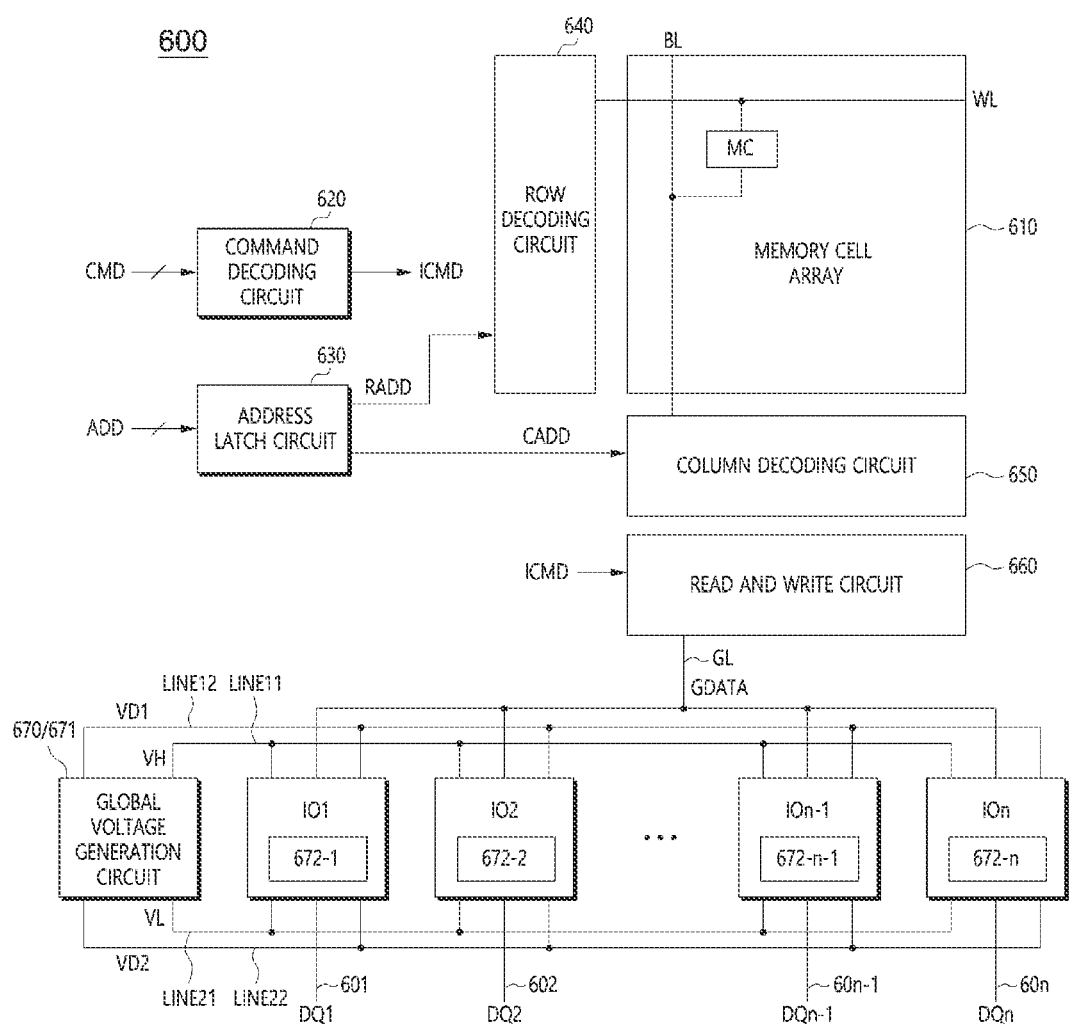
FIG. 9 is a diagram illustrating a construction of a semiconductor device according to an embodiment.

FIG. 9 is a diagram illustrating a construction of a semiconductor device 600 according to an embodiment. The semiconductor device 600 may include a memory cell array 610, a command decoding circuit 620, an address latch circuit 630, a row decoding circuit 640, a column decoding circuit 650, a read and write circuit 660, a voltage generation circuit 670, and a plurality of input and output circuits IO1 to IOn. The memory cell array 610 may include a plurality of word lines WL and a plurality of bit lines BL. A plurality of memory cells MC may be coupled to points at which the plurality of word lines WL and the plurality of bit lines BL are intersected, respectively. The command decoding circuit 620 may receive a command signal CMD and may generate an internal command signal ICMD by decoding the command signal CMD. The command decoding circuit 620 may provide the internal command signal ICMD to the read and write circuit 660. The command signal CMD may be a signal that instructs the semiconductor device 600 to perform various operations. For example, the command signal CMD may include information capable of instructing the semiconductor device 600 to perform an active operation, a write operation, a read operation, a precharge operation, and a refresh operation. The command decoding circuit 620 may output an active signal, a write signal, a read signal, a precharge signal, and a refresh signal to the internal command signal ICMD, based on the command signal CMD. The address latch circuit 630 may receive an address signal ADD and latch the address signal ADD. The address latch circuit 630 may generate a row address signal RADD and a column address signal CADD from the address signal ADD. The address signal ADD may be a signal for selecting the plurality of memory cells MC of the memory cell array 610. The row address signal RADD may be used as a signal for selecting a specific word line, among the plurality of word lines WL of the memory cell array 610. The column address signal CADD may be used as a signal for selecting a specific bit line, among the plurality of bit lines BL of the memory cell array 610. The address latch circuit 630 may provide the row address signal RADD to the row decoding circuit 640 and may provide the column address signal CADD to the column decoding circuit 650.

The row decoding circuit 640 may receive the row address signal RADD and may select the plurality of word lines WL based on the row address signal RADD. The row decoding circuit 640 may decode the row address signal RADD and may select or enable a specific word line, among the plurality of word lines WL, based on the decoded signal. The column decoding circuit 650 may receive the column address signal CADD and may select the plurality of bit lines BL based on the column address signal CADD. The column decoding circuit 650 may decode the column address signal CAAD and may select a specific bit line, among the plurality of bit lines BL, based on the decoded signal. When the row decoding circuit 640 selects a specific word line based on the row address signal RADD and the column decoding circuit 650 selects a specific bit line based on the column address signal CADD, a memory cell that is coupled between the selected word line and the selected bit line may be accessed.

The read and write circuit 660 may receive the internal command signal ICMD and may store data corresponding to global data GDATA in the accessed memory cell or may generate the global data GDATA by reading data that have been stored in the accessed memory cell. When receiving the internal command signal ICMD including a read signal, the read and write circuit 660 may read data that have been stored in the accessed memory cell and may generate global data GDATA from the read data. The read and write circuit 660 may output the global data GDATA to the global data line GL. When receiving the internal command signal ICMD including a write signal, the read and write circuit 660 may write, into the accessed memory cell, the global data GDATA that are transmitted through a global data line GL. The accessed memory cell may store data corresponding to the global data GDATA.

The plurality of input and output circuits IO1 to IOn may be coupled to the global data line GL in common and may be coupled to a plurality of data transmission lines 601 to 60n independently. The plurality of data transmission lines 601 to 60n may each be a signal path, a bus, and/or a channel through which the semiconductor device 600 is coupled to an external device. For example, the plurality of input and output circuits IO1 to IOn may include first to n-th input and output circuits IO1, IO2 to IOn−1, and IOn. In this case, n may be an integer equal to or greater than 4. The first input and output circuit IO1 may be coupled between the global data line GL and a first data transmission line 601. The first input and output circuit IO1 may generate first data DQ1 based on the global data GDATA that are transmitted through the global data line GL and may output the first data DQ1 through the first data transmission line 601. The first input and output circuit IO1 may generate the global data GDATA based on the first data DQ1 that are received through the first data transmission line 601 and may output the global data GDATA to the global data line GL. The second input and output circuit IO2 may be coupled between the global data line GL and a second data transmission line 602. The second input and output circuit IO2 may generate second data DQ2 based on the global data GDATA that are transmitted through the global data line GL and may output the second data DQ2 through the second data transmission line 602. The second input and output circuit IO2 may generate the global data GDATA based on the second data DQ2 that are received through the second data transmission line 602 and may output the global data GDATA to the global data line GL. The (n−1)-th input and output circuit IOn−1 may be coupled between the global data line GL and an (n−1)-th data transmission line 60n-1. The (n−1)-th input and output circuit IOn−1 may generate (n−1)-th data DQn−1 based on the global data GDATA that are transmitted through the global data line GL and may output the (n−1)-th data DQn−1 through the (n−1)-th data transmission line 60n-1. The (n−1)-th input and output circuit IOn−1 may generate the global data GDATA based on the (n−1)-th data DQn−1 that are received through the (n−1)-th data transmission line 60n-1 and may output the global data GDATA to the global data line GL. The n-th input and output circuit IOn may be coupled between the global data line GL and the n-th data transmission line 60n. The n-th input and output circuit IOn may generate n-th data DQn based on the global data GDATA that are transmitted through the global data line GL and may output the n-th data DQn through the n-th data transmission line 60*n*. The n-th input and output circuit IO*n* may generate the global data GDATA based on the n-th data DQ*n* that are received through the n-th data transmission line 60*n* and may output the global data GDATA to the global data line GL. The global data GDATA may be parallel data. The first to n-th data DQ1, DQ2 to DQ*n*−1, and DQ*n* may be serial data. The first to n-th input and output circuits IO1, IO2 to IO*n*−1, and IO*n* may each include a serializer-deserializer (SerDes).

The voltage generation circuit 670 may include a global voltage generation circuit 671 and a plurality of local voltage generation circuits 672-1, 672-2 to 672-*n*−1, and 672-*n*. The global voltage generation circuit 671 may include the global voltage converter 212 and the global driver 211, illustrated in FIG. 4. The global voltage generation circuit 671 may be separately provided outside the first to n-th input and output circuits IO1, IO2 to IO*n*−1, and IO*n*. For example, the global voltage generation circuit 671 may be disposed to be adjacent to the first input and output circuit IO1. The first input and output circuit IO1 may be nearest to the global voltage generation circuit 671. The n-th input and output circuit IO*n* may be farthest from the global voltage generation circuit 671. The plurality of local voltage generation circuits 672-1, 672-2 to 672-*n*−1, and 672-*n* may include the local drivers 231, 241, and 251, respectively, and the local voltage converters 232, 242, and 252, respectively, which have been illustrated in FIG. 4. The plurality of local voltage generation circuits 672-1, 672-2 to 672-*n*−1, and 672-*n* may be included in the first to n-th input and output circuits IO1, IO2 to IO*n*−1, and IO*n*, respectively. For example, the local voltage generation circuits 672-*n* that is included in the n-th input and output circuit IO*n* may include the first local driver 231 and the first local voltage converter 232, illustrated in FIG. 4. The local voltage generation circuits 672-1 and 672-2 to 672-*n*−1 that are included in the first to n−1-th input and output circuits IO1 and IO2 to IO*n*−1, respectively, may include the second or third local driver 241 or 251 and the second or third local voltage converter 242 or 252, respectively, which have been illustrated in FIG. 4. The global voltage generation circuit 671 may provide the first boundary voltage VH to the first to n-th input and output circuits IO1, IO2 to IO*n*−1, and IO*n* through the first voltage line LINE11 and may provide the first driving voltage VD1 to the first to n-th input and output circuits IO1, IO2 to IO*n*−1, and IO*n* through the second voltage line LINE12. The global voltage generation circuit 671 may provide the second boundary voltage VL to the first to n-th input and output circuits IO1, IO2 to IO*n*−1, and IO*n* through the third voltage line LINE21 and may provide the second driving voltage VD2 to the first to n-th input and output circuits IO1, IO2 to IO*n*−1, and IO*n* through the fourth voltage line LINE22. The local voltage generation circuits 672-1, 672-2 to 672-*n*−1, and 672-*n* of the first to n-th input and output circuits IO1, IO2 to IO*n*−1, and IO*n* may generate internal voltages that are used in the first to n-th input and output circuits IO1, IO2 to IO*n*−1, and IO*n*, respectively, based on the supplied voltages through the first to fourth voltage lines LINE11, LINE12, LINE21, and LINE22.

Those skilled in the art to which the present technology pertains may understand that the present technology may be implemented in various other forms without departing from the technical spirit or essential characteristics of the present technology. Accordingly, it is to be understood that the aforementioned embodiments are illustrative from all aspects not being limitative. The scope of the present technology is defined by the appended claims rather than by the detailed description, and all modifications or variations derived from the meanings and scope of the claims and equivalents thereof should be understood as being included in the scope of the present technology.

What is claimed is:

1. A voltage generation circuit comprising:
a global driver configured to change a voltage level of a second voltage line by differentially amplifying a voltage level of a first boundary voltage and a voltage level of a first voltage line and configured to change a voltage level of a fourth voltage line by differentially amplifying a voltage level of a second boundary voltage and a voltage level of a third voltage line;
a local driver configured to adjust the voltage level of the first voltage line based on the voltage level of the second voltage line and a bias voltage and configured to adjust the voltage level of the third voltage line based on the voltage level of the fourth voltage line and the bias voltage; and
a local voltage converter configured to generate an internal voltage having a voltage level between the voltage levels of the first and third voltage lines based on a local decoding signal.

2. The voltage generation circuit according to claim 1, wherein the global driver comprises:
a first differential amplifier configured to output a first driving voltage to the second voltage line by differentially amplifying the voltage level of the first boundary voltage and the voltage level of the first voltage line; and
a second differential amplifier configured to output a second driving voltage to the fourth voltage line by differentially amplifying the voltage level of the second boundary voltage and the voltage level of the third voltage line.

3. The voltage generation circuit according to claim 1, wherein the local driver comprises:
a first pull-up driver configured to supply a first power supply voltage to the first voltage line based on the voltage level of the second voltage line;
a first pull-down driver configured to, based on the bias voltage, adjust an amount of current that flows from the first voltage line to a terminal to which a second power supply voltage is supplied;
a second pull-up driver configured to supply the first power supply voltage to the third voltage line based on the voltage level of the fourth voltage line; and
a second pull-down driver configured to, based on the bias voltage, adjust an amount of current that flows from the third voltage line to the terminal to which the second power supply voltage is supplied.

4. The voltage generation circuit according to claim 3, wherein the first pull-up driver comprises a first P channel MOS transistor, and
wherein a gate of the first P channel MOS transistor is coupled to the second voltage line, a source of the first P channel MOS transistor receives the first power supply voltage, and a drain of the first P channel MOS transistor is coupled to the first voltage line.

5. The voltage generation circuit according to claim 3, wherein the first pull-down driver comprises a first N channel MOS transistor, and
wherein a gate of the first N channel MOS transistor receives the bias voltage, a drain of the first N channel MOS transistor is coupled to the first voltage line, and a source of the first N channel MOS transistor is coupled to the terminal to which the second power supply voltage is supplied.

6. The voltage generation circuit according to claim 3, wherein the second pull-up driver comprises a second P channel MOS transistor, and
wherein a gate of the second P channel MOS transistor is coupled to the fourth voltage line, a source of the second P channel MOS transistor receives the first power supply voltage, and a drain of the second P channel MOS transistor is coupled to the third voltage line.

7. The voltage generation circuit according to claim 3, wherein the second pull-down driver comprises a second N channel MOS transistor, and
wherein a gate of the second N channel MOS transistor receives the bias voltage, a drain of the second N channel MOS transistor is coupled to the third voltage line, and a source of the second N channel MOS transistor is coupled to the terminal to which the second power supply voltage is supplied.

8. The voltage generation circuit according to claim 1, wherein the local voltage converter comprises:
a plurality of local resistors coupled in series between the first voltage line and the third voltage line; and
a selection circuit configured to output one divided voltage, among a plurality of divided voltages that are output from nodes between the plurality of local resistors, as the internal voltage based on the local decoding signal.

9. The voltage generation circuit according to claim 1, further comprising a global voltage converter configured to generate the first boundary voltage and the second boundary voltage, each having a voltage level between a first power supply voltage and a second power supply voltage, based on a global decoding signal.

10. The voltage generation circuit according to claim 9, wherein the global voltage converter comprises:
a plurality of global resistors that are coupled between a terminal to which the first power supply voltage is supplied and a terminal to which the second power supply voltage is supplied; and
a selection circuit configured to output two divided voltages, among a plurality of divided voltages that are output from nodes between the plurality of global resistors, as the first boundary voltage and the second boundary voltage, based on the global decoding signal.

11. The voltage generation circuit according to claim 1, further comprising:
a first capacitor that is coupled between the first voltage line and the second voltage line; and
a second capacitor that is coupled between the third voltage line and the fourth voltage line.

12. A semiconductor device comprising a voltage generation circuit,
wherein the voltage generation circuit comprises:
a global driver configured to change a voltage level of a second voltage line by differentially amplifying a voltage level of a first boundary voltage and a voltage level of a first voltage line and configured to change a voltage level of a fourth voltage line by differentially amplifying a voltage level of a second boundary voltage and a voltage level of a third voltage line;
a first local driver configured to adjust the voltage level of the first voltage line based on the voltage level of the second voltage line, a bias voltage, and a first enable signal and configured to adjust the voltage level of the third voltage line based on the voltage level of the fourth voltage line, the bias voltage, and the first enable signal;
a first local voltage converter configured to generate a first internal voltage having a voltage level between the voltage levels of the first and third voltage lines based on a first local decoding signal;
a second local driver configured to adjust the voltage level of the first voltage line based on the voltage level of the second voltage line, the bias voltage, and a second enable signal and configured to adjust the voltage level of the third voltage line based on the voltage level of the fourth voltage line, the bias voltage, and the second enable signal; and
a second local voltage converter configured to generate a second internal voltage having a voltage level between the voltage levels of the first and third voltage lines based on a second local decoding signal.

13. The semiconductor device according to claim 12, wherein the global driver comprises:
a first differential amplifier configured to output a first driving voltage to the second voltage line by differentially amplifying the voltage level of the first boundary voltage and the voltage level of the first voltage line; and
a second differential amplifier configured to output a second driving voltage to the fourth voltage line by differentially amplifying the voltage level of the second boundary voltage and the voltage level of the third voltage line.

14. The semiconductor device according to claim 12, wherein the second local driver and the second local voltage converter are disposed at a first location, the first local driver and the first local voltage converter are disposed at a second location, a distance from the global driver to the second location is greater than a distance from the global driver to the first location, and
wherein the first enable signal is enabled earlier than the second enable signal.

15. The semiconductor device according to claim 12, wherein the first local driver comprises:
a first pull-up driver configured to supply a first power supply voltage to the first voltage line based on the voltage level of the second voltage line;
a first pull-down driver configured to, based on the bias voltage, adjust an amount of current that flows from the first voltage line to a terminal to which a second power supply voltage is supplied;
a first switch configured to, based on the first enable signal, couple the first pull-down driver and the terminal to which the second power supply voltage is supplied;
a second pull-up driver configured to supply the first power supply voltage to the third voltage line based on the voltage level of the fourth voltage line;
a second pull-down driver configured to, based on the bias voltage, adjust an amount of current that flows from the third voltage line to the terminal to which the second power supply voltage is supplied; and
a second switch configured to, based on the first enable signal, couple the second pull-down driver and the terminal to which the second power supply voltage is supplied.

16. The semiconductor device according to claim 15, wherein the second local driver comprises:

a third pull-up driver configured to supply the first power supply voltage to the first voltage line based on the voltage level of the second voltage line;

a third pull-down driver configured to, based on the bias voltage, adjust an amount of current that flows from the first voltage line to the terminal to which the second power supply voltage is supplied;

a third switch configured to, based on the second enable signal, couple the third pull-down driver and the terminal to which the second power supply voltage is supplied;

a fourth pull-up driver configured to supply the first power supply voltage to the third voltage line based on the voltage level of the fourth voltage line;

a fourth pull-down driver configured to, based on the bias voltage, adjust an amount of current that flows from the third voltage line to the terminal to which the second power supply voltage is supplied; and a fourth switch configured to, based on the first enable signal, couple the fourth pull-down driver and the terminal to which the second power supply voltage is supplied.

17. The semiconductor device according to claim 12, further comprising a global voltage converter configured to generate the first boundary voltage and the second boundary voltage, each having a voltage level between a first power supply voltage and a second power supply voltage, based on a global decoding signal.

18. The semiconductor device according to claim 12, further comprising:

a first internal circuit configured to operate based on the first internal voltage; and a second internal circuit configured to operate based on the second internal voltage, wherein the first and second internal circuits perform an identical type of function.

19. A voltage generation circuit comprising:

a global driver configured to output a first driving voltage having a constant voltage level to a second voltage line by differentially amplifying a voltage level of a first boundary voltage and a voltage level of a first voltage line and configured to output a second driving voltage having a constant voltage level to a fourth voltage line by differentially amplifying a voltage level of a second boundary voltage and a voltage level of a third voltage line;

a local driver configured to adjust the voltage level of the first voltage line based on the first driving voltage and a bias voltage and configured to adjust the voltage level of the second voltage line based on the second driving voltage and the bias voltage; and a local voltage converter configured to generate an internal voltage having a voltage level between the voltage levels of the first and third voltage lines based on a local decoding signal.

20. The voltage generation circuit according to claim 19, wherein the first driving voltage has a voltage level complementary to the voltage level of the first boundary voltage, and wherein the second driving voltage has a voltage level complementary to the voltage level of the second boundary voltage.

21. The voltage generation circuit according to claim 19, further comprising:

a first capacitor that is coupled between the first voltage line and the second voltage line; and a second capacitor that is coupled between the third voltage line and the fourth voltage line.

* * * * *